United States Patent [19]

Priola et al.

[11] 3,896,097

[45] July 22, 1975

[54] PROCEDURE FOR THE PRODUCTION OF POLYMERS AND COPOLYMERS OF ISOBUTYLENE

[75] Inventors: Aldo Priola; Sebastiano Cesca; Giuseppe Ferraris, all of San Donato Milanese, Italy

[73] Assignee: Snam Progetti S.p.A., San Donato Milanese, Italy

[22] Filed: Apr. 17, 1973

[21] Appl. No.: 352,084

[30] Foreign Application Priority Data
Apr. 17, 1972  Italy................................. 23216/72

[52] U.S. Cl......... 260/85.3 R; 260/79.5 A; 260/94.8
[51] Int. Cl.......... C08d 1/26; C08d 3/04; C08f 3/14
[58] Field of Search....................... 260/85.3 R, 94.8

[56] References Cited
UNITED STATES PATENTS

| | | |
|---|---|---|
| 2,536,841 | 1/1951 | Dornte et al...................... 260/94.8 |
| 2,581,154 | 1/1952 | Walsh, Jr. et al.............. 260/85.3 R |
| 2,931,791 | 4/1960 | Ernst et al...................... 260/85.3 R |
| 3,024,226 | 3/1962 | Nolan, Jr. et al................. 260/94.8 |
| 3,426,007 | 2/1969 | Kennedy...................... 260/85.3 R |

*Primary Examiner*—Joseph L. Schofer
*Assistant Examiner*—A. Holler
*Attorney, Agent, or Firm*—Ralph M. Watson, Esq.

[57] ABSTRACT

A method is disclosed for the polymerization of isobutylene and, in particular, the copolymerization of isobutylene and isoprene, by contacting the monomers with a catalyst system constituted by (a) an organoaluminum compound (e.g., $Al(C_2H_5)_2Cl$) and (b) an oxide or anhydride of an element belonging to Group VI B or VII B of the periodic system (e.g., $SO_2$), in a liquid reaction medium, wherein the molar ratio of compound (b) to compound (a) is less than 1, at a temperature in the range of about −40° to +15°C.

9 Claims, No Drawings

PROCEDURE FOR THE PRODUCTION OF POLYMERS AND COPOLYMERS OF ISOBUTYLENE

The present invention relates to a procedure for the production of polymers and copolymers of isobutylene using a particular catalyst system which enables us to utilize higher reaction temperatures than those previously used industrially; it also enables us to obtain higher yields in polymers having a higher molecular weight and generally better properties, logically dependent upon the operating conditions selected and other factors known to those skilled in the art.

More particularly, this invention relates to a procedure for the production of butyl rubber.

It is well known that butyl rubber is industrially produced by means of a process of copolymerization achieved by utilizing cationic type initiators.

In particular, the copolymerization is achieved utilizing $AlCl_3$ in ethyl chloride or methyl chloride solution at $-100°C$.

The use of a solid catalyst insoluble in common hydrocarbon solvents and only slightly soluble in chloride solvents, has created many difficulties in the realization of an efficacious control of this reaction.

We note that the preparation of the catalyst solution was already somewhat complex, and that in general, it is achieved by means of a passage of a stream of ethyl chloride or methyl chloride on a bed of solid aluminum trichloride.

Also the subsequent determination of the catalyst concentration that is achieved through titration of $AlCl_3$ is very complex and it often gives very unexpected results. It is evident, from the above, that there has been much effort lately on the part of various researchers and industries interested in the production of this type of rubber, towards the discovery of new catalyst systems that would simultaneously solve the problems of the preparation of the catalyst and the raising of the temperature of polymerization without of course compromising the properties of the rubber and, in particular, without lowering the value of the molecular weight.

Recently, some researchers perfected a new soluble catalyst system that enables us to obtain butyl rubber with a high molecular weight at considerably higher temperature than those normally used in industrial processes.

The system in question derives from a combination of an halide of Friedel-Crafts modified, for example $AlEt_2Cl$, with an appropriate co-catalyst. These halides are not usually capable of initiating the polymerization of isobutylene by themselves, or of mixtures of isobutylene with diene monomers or other monomers that normally polymerize with a cationic type mechanism.

The polymerization or copolymerization begins only when the co-catalyst is introduced. This co-catalyst may be composed of a substance able to produce protons such as, for example, HCl and other acids of Bronsted, or by a substance capable of supplying carbon ions, such as, for example, t-butyl chloride.

The assignee of this application owns a copending U.S. Pat. application Ser. No. 195,423, filed Nov. 3, 1971, pertaining to a procedure for the production of butyl rubber by means of the use of a catalyst system constituted by a reducing aluminium compound and by co-catalyst capable of giving cations for interaction with the catalyst.

The co-catalyst may be a halogen introduced as such, or other interhalogenic compounds.

The process which has now been perfected by us, and which constitutes the subject of the present application, presents all the advantages of the catalyst systems mentioned previously and which are essentially associated with considerable ease of the control of the polymerization reaction owing to the solubility of these catalysts in common organic solvents, so that whenever necessary, it is possible to operate with minimum quantities of solvent when necessary or even in its total absence, in which case, the same non-reacted monomer functions as a diluent.

In contradistinction to the processes using halides of dialkylaluminum and strong acids, it also presents the advantage of obtaining products of higher molecular weight and at even higher reaction temperatures.

It also presents major regularity in the polymerization process, permitting, in fact, a major control of the temperature, and therefore a higher regularity in the polymers produced.

Then, in comparison to the systems using halogen solutions and interhalogenic compounds, it has the great advantage of being easier to handle with regard to the compounds used as catalysts.

Besides, it has the still greater advantage of greater ease in dosing the co-catalyst, eventually also during the polymerization, as compared to the Bronsted acids, and it is more economical with regard to the co-catalysts composed of alkylic halides, especially taking into account the high quality of purity that they must possess.

While this application is primarily concerned with the production of butyl rubber, in view of the industrial interest in this substance, it will be easy for the expert on the subject using the catalyst system described herein, to find the ideal conditions for the copolymerization of different monomers.

In particular, the usable mono-olefine may include from 4 to 9 carbon atoms ($C_4 - C_9$), while the multiolefine, which is generally constituted by a conjugated di-olefine with from 4 to 14 carbon atoms ($C_4 - C_{14}$), such as isoprene, butadiene, 2,3-dimethyl 1,3-butadiene, while examples of the first may be isobutyiene, 2-methyl butene-1, 3-methyl-butene-1, 2-methyl-butene-2, 4-methyl-pentene-1. As we mentioned, only great industrial interest has prompted the applicants to limit their examples to the case of butyl rubber, that is, to the copolymerization of isobutylene and isoprene quantities ranging from 90 to 99.5% in isobutylene weight and from 10 to 0.5% in isoprene weight.

The reaction media used are those which are normally used in the art, namely, ethyl chloride, methyl chloride, or methylene chloride. Hydrocarbon compounds may also be used as long as they are liquid at the temperature of reaction, such as, for example, pentane, isopentane, n-heptane, cyclohexane, or even solvents maintained in a liquid phase at the temperature of reaction, such as the monomer or the monomers used.

The molecular weights of the product obtained vary over a wide range according to the conditions adopted.

The catalyst system of the invention includes:

a. a metalorganic compound represented by the aluminum of formula $Al\ R^1\ R^2\ X$ wherein X is a halogen atom and $R^1$ is a hydrocarbon radical having from 1 to 10 carbon atoms, or hydrogen; $R^2$ is the same as R¹, or is an alkoxy group having from 1 to 10 carbon atoms.

b. an oxide or an anhydride of an element belonging to the 6th B or 7th B group of the periodic system; as component (b), an advantageous use may be made of sulphurous anhydride (SO₂), sulphuric anhydride, various oxides and anhydrides such as $Cl_2O$ $ClO_2$ $Cl_2O_7$ $BrO_2$ $IrO_5$ and the like.

Owing to the great activity of the cocatalyst (b), the amount thereof in the catalyst system may be kept at very low values, which gives rise to remarkable advantages from an economical and technological point of view, because of reducing the ash content in the obtained polymer. Moreover the reduced cocatalyst amount that is necessary practically removes any possibility of secondary reactions such as chain transfer which depend on the catalyst concentration.

From a practical point of view use may be made of very low molar ratios between compound b) and compound a) ranging between 0.5 and $10^{-5}$.

The polymerization reaction according to our invention is conducted at a temperature between −40° and +15°C.

The molecular weights of the polymers prepared in the following examples were obtained by means of viscosimetric measures of polymer solutions in cyclohexane at 30°C.

After having determined the intrinsic viscosity by extrapolation at O = O of the $\ln \eta r/c$ and $\ln \eta sp/c$ curves, the average molecular weight of the single polymers was calculated by the following equation:

$\ln M_r = 11.98 + 1.452 \ln [\eta]$

The invention will be more clearly understood from the examination of the following illustrative examples.

EXAMPLE 1

The test was carried out in a glass tubular reactor of a capacity of 300 cm³, having a mechanical agitator and a thermometric sheath, previously dried by heating under a dry Argon flow, and maintained during the execution of the experiment under a slight positive pressure of Argon (30 mm Hg in respect to the atmospheric pressure).

In said apparatus we condensed 80 cm³ of liquid $CH_3Cl$, and then we introduced 28.4 grams of isobutylene and 0.84 g of isoprene (isoprene/isobutene molar ratio = 0.024).

The reaction temperature was brought to −40°C, then were slowly introduced 2 mmoles (0.254 cm³) of Al Et₂ Cl (Et = ethyl) diluted in 5 cm³ of $CH_3$ Cl and no polymer formation was observed. To the reaction mixture we subsequently added, under violent agitation, 0.02 mmole of SO₂ dissolved in 5 cm³ of $CH_3$ Cl graduating the addition over a period of 7 minutes for which we had a temperature increase of 3°C. We continued the shaking for ten minutes after the end of the addition and then we stopped the reaction by adding ammonia methanol to the polymer suspension which was produced.

After washing and drying we obtained 14.45 grams of polymer (yield = 51%) which supplied a value of [η] = 1.14 dl/g, determined in cyclohexane, which corresponds to an average viscosimetric molecular weight equal to 400,000 and an unsaturation content determined by iodometric means, corresponding to 2.88% in isoprene weight.

The polymer obtained was made to undergo vulcanization using a mixture of the following composition prepared on an open roll mixer:

| Polymer | 100 | parts |
|---|---|---|
| EPC black | 50 | " |
| Antioxidant 2246 | 1 | " |
| ZnO | 5 | " |
| Stearic Acid | 3 | " |
| Sulphur | 2 | " |
| MB TDS (mercapto-benzothiazoledisulphide) | 0.5 | " |
| TMTD (tetramethyl-thiuramdisulphide) | 1 | " |

The mixture was vulcanized at 153°C for 20, 40 and 60 minutes. The properties of the vulcanized material obtained were collected in Table 1; in Table 2 we show, for purpose of comparison, the properties of a typical sample of commercial butyl rubber determined under the same conditions.

TABLE 1

| Vulcanization time (minutes) | 20 | 40 | 60 |
|---|---|---|---|
| Modulus at 100% (Kg/cm²) | 12 | 16 | 17 |
| Modulus at 200% (Kg/cm²) | 21 | 28 | 36 |
| Modulus at 300% (Kg/cm²) | 35 | 49 | 62 |
| Ultimate tensile strength (Kg/cm²) | 208 | 210 | 216 |
| Elongation at break % | 810 | 705 | 660 |
| Permanent set (%) | 37 | 32 | 31 |

TABLE 2

| Vulcanization time (°) (minutes) | 20 | 40 | 60 |
|---|---|---|---|
| Modulus at 100% (Kg/cm²) | 11 | 15 | 16 |
| Modulus at 200% (Kg/cm²) | 18 | 27 | 33 |
| Modulus at 300% (Kg/cm²) | 30 | 47 | 58 |
| Ultimate tensile strength (Kg/cm²) | 215 | 221 | 210 |
| Elongation at break % | 815 | 715 | 650 |
| Permanent set (%) | 35 | 29 | 29 |

(°) Commercial sample with a viscosimetric molecular weight equal to about 450,000 and an unsaturation content corresponding to 2.15% in isoprene weight.

The results set forth in the preceding tables showed that the polymer obtained by means of the novel catalyst system, produced at a temperature included between −37° and −40°C possesses properties equal to those of a polymer produced at a temperature of −100°C.

EXAMPLE 2

We repeated the test described in example 1 by employing the same amounts of solvent and isobutylene and 1.4 g of isoprene (isoprene/isobutylene molar ration = 0.041).

As catalyst use was made of 2 mmoles of Al Et₂ Cl dissolved in 5 cm³ of $CH_3$ Cl and, as cocatalyst, a solution containing 0.03 mmole of SO₂ dissolved in 5 cm³ of $CH_3$ Cl.

The test was carried out at the temperature of −45°C and the introduction of the cocatalyst was graduated over a period of 6 minutes for which we noted a mass temperature increase of 4°C. 12 G of dry polymer were obtained (yield = 42%) which had [η] equal to 1.86 dl/g (MW_r = 370,000) and isoprene content equal to 3.50% by weight determined iodometric ally.

The polymer was subjected to vulcanization according to the same method described for example 1 sample.

Table 3 reports the properties of the obtained polymer and table 4 shows, for comparative purposes, the properties of a commercial sample prepared at −100°C with about an equal unsaturation amount.

TABLE 3

| Vulcanization time (minutes) | 20 | 40 | 60 |
|---|---|---|---|
| Modulus at 100% (Kg/cm²) | 15 | 20 | 21 |
| Modulus at 200% (Kg/cm²) | 29 | 44 | 46 |
| Modulus at 300% (Kg/cm²) | 48 | 72 | 76 |
| Tensile strength (Kg/cm²) | 205 | 192 | 182 |
| Elongation at break % | 765 | 600 | 530 |
| Permanent set % | 42 | 38 | 29 |

TABLE 4

| Vulcanization time (°) (minutes) | 20 | 40 | 60 |
|---|---|---|---|
| Modulus at 100% (Kg/cm²) | 14 | 18 | 19 |
| Modulus at 200% (Kg/cm²) | 25 | 37 | 41 |
| Modulus at 300% (Kg/cm²) | 40 | 63 | 74 |
| Tensile strength (Kg/cm²) | 208 | 190 | 181 |
| Elongation at break % | 780 | 625 | 540 |
| Permanent set % | 42 | 35 | 33 |

(°)Commercial sample having a viscosimetric molecular weight equal to 310,000 and isoprene content equal to 3.60% by weight. By comparing the data of tables 3 and 4 the properties of the copolymer obtained according to this test result similar to the ones of the commercial copolymer having a high unsaturation amount.

EXAMPLE 3

Using the same methods reported in example 1, we introduced into the reactor the same amounts of $CH_3Cl$, isobutylene and isoprene, and the temperature was brought to −30°C. Then, the stirred reaction mixture was added with 2 mmoles of Al $Et_2$ Cl and then slowly, 0.002 mmole of $SO_2$ dissolved in $CH_3Cl$ (Al/$SO_2$ molar ratio = 1000) over a period of 2 minutes during which we noted a temperature increase of 3°C.

The stirring was protracted for 10 minutes during which 4.3 g of polymer were obtained (yield = 15.1%) having $MW_r$ equal to 325,000 and unsaturation content equal to 2.70% by isoprene weight.

The behaviour to vulcanization of the obtained polymer was similar to the one of the example 1 sample.

EXAMPLE 4

The example 1 test was repeated by employing the same reagent amounts and working at the temperature of −40°C. Then we introduced into the reactor 2 mmoles of Al $Et_2$ Cl and started the reaction by adding 0.2 mmole of $SO_2$.

The reaction ran explosively and the temperature suddenly rose to −23°C at which the solvent was beginning to boil. 20 g of polymer were obtained (yield = 70.5%) having $MW_r$ = 155,000 and unsaturation content corresponding to 2.2% by isoprene weight.

EXAMPLE 5

By working according to example 1 we introduced into the reactor the same amounts of solvent, monomers and Al $Et_2$ Cl. The temperature was brought to −40°C and the polymerization was started by gradual introduction of a solution containing 0.06 mmole of $SO_3$ in $CH_3Cl$ over a period of 2 minutes, during which we noted a temperature increase of 2°C.

The stirring was protracted over 10 minutes and 5.4 g of polymer (yield = 19%) having [η] in cyclohexane equal to 2.16 dl/g ($MW_r$ = 470.000) and unsaturation content equal to 2.45% by isoprene weight.

EXAMPLE 6

We operated according to example 1 but employed, as catalyst, 2 mmoles of Al $Et_2$ Br and, as cocatalyst, 0.04 mmole of $SO_2$ dissolved in 5 cm³ of $CH_3Cl$ and slowly added at the temperature of −40°C over a period of 5 minutes during which we noted a temperature increase of 4°C.

The formation of 12.5 g of polymer was obtained (yield = 44%) which showed a [η] equal to 1.55 dl/g ($MW_r$ = 280,000) and an unsaturation content corresponding to 2.30% by isoprene weight.

EXAMPLE 7

We operated according to example 1, but employing the same amounts of solvent, isobutylene, isoprene and, as catalyst, 2 mmoles of Al $Et_2$ Cl. To the reaction mixture, kept under stirring at the temperature of −40°C, was slowly added, over a period of 5 minutes, a solution containing 0.1 mmole of $Cl_2O$ disolved in 5 cm³ of $CH_3Cl$. We observed a temperature increase of 4°C and obtained, at reaction end, 13.2 g of polymer (yield = 46.5%) having $MW_r$ = 340,000 and unsaturation content corresponding to 3.75% by isoprene weight.

EXAMPLE 8

According to the method of example 1, we introduced into the reactor the same amounts of solvent, isobutene and isoprene, then we introduced 2 mmoles of Al Et . OEt . Cl and brought the temperature to −40°C.

No polymer formation was observed in the reaction mixture. The polymerization reaction was started by a gradual addition of a solution containing 0.05 mmoles of $SO_2$ dissolved in 5 cm³ of $CH_3$ Cl over a period of 5 minutes, during which we noted a temperature increase of 3°C. 6.5 g of dry polymer were obtained (yield = 23%) having average molecular weight equal to 285,000 and unsaturation content corresponding to 2.4% by isoprene weight.

We claim:

1. Process for the production of polymers and copolymers of isobutylene, wherein the polymerization reaction is conducted in the presence of a catalytic system consisting essentially of:
   a. a metalorganic compound of aluminum represented by the formula $AlR^1R^2X$ wherein X is a halogen atom; $R^1$ is ethyl; and $R^2$ is the same as $R^1$ or ethoxy,
   and
   b. $Cl_2O$ or, when (a) is AlEt.Oet.Cl, $SO_2$.

2. Process according to claim 1 wherein the molar ratio between the total quantity of compound (b) and compound (a) is less than 1.

3. Process according to claim 1, wherein the polymerization reaction is effected in the presence of a reaction medium selected from the aliphatic hydrocarbons, the aromatics, the cycloaliphatics, the mono- and the poly-halogenated hydrocarbons and mixtures thereof.

4. Process according to claim 3, wherein the reaction medium is methyl chloride.

5. Process according to claim 1, wherein the polymerization is effected at a temperature between −70° and +30°C.

6. Process according to claim 1, wherein the monomer copolymerized with the isobutylene is isoprene.

7. Process according to claim 6, wherein the copolymerization reaction is effected by feeding to the zone of reaction a mixture of isobutylene and isoprene in quantities varying from 90 to 99.5% of isobutylene by weight and from 10 to 0.5% of isoprene by weight.

8. Process according to claim 1, wherein compound (a) is Al Et$_2$ Cl and compound (b) is Cl$_2$O.

9. Process according to claim 1, wherein compound (a) is AlEt.OEt.Cl.

* * * * *

UNITED STATES PATENT OFFICE
CERTIFICATE OF CORRECTION

Patent No. 3,896,097  Dated July 22, 1975

Inventor(s) Aldo Priola, Sebastiano Cesca, Giuseppe Ferraris

It is certified that error appears in the above-identified patent and that said Letters Patent are hereby corrected as shown below:

Column 2, line 22, After "comparison" delete "to" and substitute --with--.

line 44, Correct spelling of "isobutylene".

Column 6, line 20, Correct spelling of "dissolved".

line 53, Correct "Oet" to read --OEt--.

Signed and Sealed this

Seventh Day of November 1978

[SEAL]

Attest:

RUTH C. MASON  
Attesting Officer

DONALD W. BANNER  
Commissioner of Patents and Trademarks